(12) United States Patent
Skorupa et al.

(10) Patent No.: US 11,879,379 B2
(45) Date of Patent: Jan. 23, 2024

(54) ACTUATING DEVICE FOR ACTUATING A VALVE ELEMENT OF AN EXHAUST GAS TURBOCHARGER

(71) Applicant: Daimler AG, Stuttgart (DE)

(72) Inventors: Sven Skorupa, Walddorfhaeslach (DE); Martin Pfeiffer, Winnenden (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 20 days.

(21) Appl. No.: 17/616,027

(22) PCT Filed: May 14, 2020

(86) PCT No.: PCT/EP2020/063416
§ 371 (c)(1),
(2) Date: Dec. 2, 2021

(87) PCT Pub. No.: WO2020/244897
PCT Pub. Date: Dec. 10, 2020

(65) Prior Publication Data
US 2022/0316390 A1     Oct. 6, 2022

(30) Foreign Application Priority Data

Jun. 3, 2019 (DE) ..................... 10 2019 003 909.2

(51) Int. Cl.
*F02B 37/18* (2006.01)
(52) U.S. Cl.
CPC ........ *F02B 37/186* (2013.01); *F05D 2220/40* (2013.01)

(58) Field of Classification Search
CPC ...... F02B 37/18; F02B 37/183; F02B 37/186; F02B 39/00; F05D 2220/40; F16K 49/00
See application file for complete search history.

(56) References Cited

U.S. PATENT DOCUMENTS

| | | | |
|---|---|---|---|
| 4,251,050 A | 2/1981 | McInerney | |
| 5,148,678 A | 9/1992 | Ueda et al. | |
| 5,413,073 A * | 5/1995 | Larson | ..................... F01L 3/02 123/188.9 |

(Continued)

FOREIGN PATENT DOCUMENTS

| | | |
|---|---|---|
| CN | 102227549 A | 10/2011 |
| DE | 103 28 191 A1 | 1/2005 |

(Continued)

OTHER PUBLICATIONS

PCT/EP2020/063416, International Search Report dated Jul. 3, 2020 (Three (3) pages).

(Continued)

*Primary Examiner* — Loren C Edwards
(74) *Attorney, Agent, or Firm* — Crowell & Moring LLP

(57) ABSTRACT

An actuating device for actuating a valve element of an exhaust gas turbocharger includes a pressure chamber which is delimited in part by a first housing element and in part by a diaphragm formed separately from the first housing element. A fluid is introducible into the pressure chamber. The diaphragm is reversibly deformable in order to actuate the valve element and the diaphragm is held on the first housing element by a first cooling ring in which sodium is accommodated.

2 Claims, 1 Drawing Sheet

(56) References Cited

U.S. PATENT DOCUMENTS

2014/0026560 A1\* 1/2014 Dobrowolski .......... F02B 39/00
                                                          60/602

FOREIGN PATENT DOCUMENTS

| DE | 10 2013 225 352 A1 | 6/2015 | |
|----|----|----|----|
| DE | 102013225352 A1 \* | 6/2015 | ........... F01N 3/2066 |
| DE | 10 2016 113 394 B3 | 10/2017 | |
| DE | 10 2016 206 955 A1 | 10/2017 | |
| JP | 2009-24502 A | 2/2009 | |
| KR | 10-1126236 B1 | 3/2011 | |
| KR | 101126236 B1 \* | 3/2012 | ................ F01P 3/12 |
| WO | WO 2014/053895 A1 | 4/2014 | |

OTHER PUBLICATIONS

Chinese Office Action issued in Chinese application No. 202080041553.5 dated Feb. 21, 2023, with partial English translation (Nine (9) pages).

\* cited by examiner

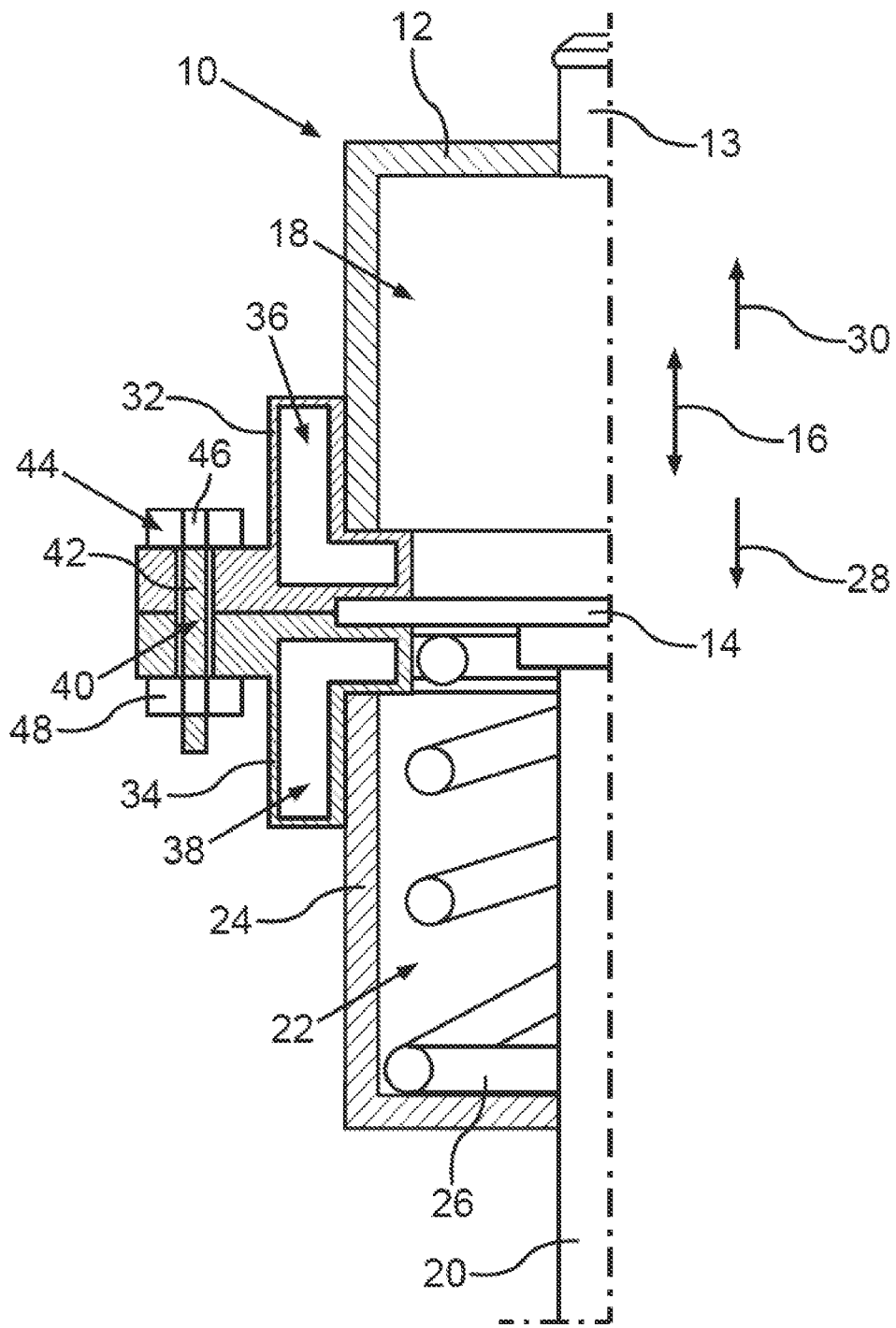

ACTUATING DEVICE FOR ACTUATING A VALVE ELEMENT OF AN EXHAUST GAS TURBOCHARGER

BACKGROUND AND SUMMARY OF THE INVENTION

The invention relates to an actuating device for actuating a valve element of an exhaust gas turbocharger.

Such actuating devices for actuating valve elements provided for setting boost pressures of exhaust gas turbochargers, which are also referred to as waste gates or waste gate valves, are already sufficiently known from the general prior art. The respective actuating device has a pressure chamber delimited in part by a respective housing element and in part by a respective diaphragm of the respective actuating device. Here, the diaphragm is formed separately from the housing element. A fluid, for example a gaseous fluid, can be introduced into the pressure chamber, whereby the diaphragm can be deformed reversibly, i.e., non-destructively, to actuate the valve element.

Furthermore, DE 10 2013 225 352 A1 discloses a cooling element for cooling an injection module, which is designed for injecting a fluid into an exhaust tract of an internal combustion engine. Furthermore, a thermal management method for operating a thermal management system is known from DE 10 2016 113 394 B3.

The object of the present invention is to further develop an actuating device of the type mentioned above in such a way that an excessively high load on the diaphragm can be avoided.

In order to further develop an actuating device of the type specified herein in such a way that an excessively high, in particular thermal, load on the diaphragm can be avoided, it is provided according to the invention that the diaphragm is held on the housing element by means of a cooling ring in which sodium is accommodated. The sodium is solid, for example, when it has a temperature of less than 98 degrees Celsius and thus a temperature lower than its melting temperature, and is thus received in the cooling ring in a solid aggregate state. If, for example, the temperature of the sodium rises to 98 degrees Celsius or more, or if the temperature of the sodium exceeds its melting temperature, the sodium becomes liquid and is consequently received in a liquid state in the cooling ring. The cooling ring represents a sodium-cooled connection of the elastically deformable diaphragm, for example, to the housing element, since the elastically deformable diaphragm, for example, is connected to the housing element via the cooling ring. As a result of this connection of the diaphragm to the housing element, an excessive thermal load on the diaphragm can be avoided, which can result in a longer service life of the diaphragm compared to conventional solutions. This is possible because sodium has a thermal conductivity of 140 watts per mK. Thus, the thermal conductivity of sodium is much greater than that of steel, since the thermal conductivity of steel ranges from 15 to 58 watts per mK. Since sodium thus has particularly advantageous heat transfer properties, particularly advantageous heat transfer properties of the cooling ring can be implemented. This means that a particularly large amount of heat can be dissipated from the diaphragm in a short time by means of the cooling ring, such that excessive thermal loads on the diaphragm can be avoided.

The actuating device is formed, for example, as a pressurized can, since the diaphragm can be actuated by introducing the fluid into the pressure chamber. By introducing the fluid into the pressure chamber, the diaphragm is acted upon, for example, by the fluid, in particular by a pressure of the fluid, as a result of which the diaphragm is deformed reversibly, i.e., non-destructively and preferably elastically. This deformation of the diaphragm can, for example, move a transmission element, in particular designed as a rod, translationally relative to the housing element, in particular along a direction of movement, whereby the valve element can be moved and thus actuated. If, for example, a temperature rises at the actuating device, which is designed in particular as a pressurized can, during an operation of a vehicle designed with an internal combustion engine comprising the exhaust gas turbocharger and thus the actuating device, to or above the melting point of sodium, the initially solid sodium liquefies in the cooling ring, also referred to as the air ring. As a result, heat can be dissipated particularly advantageously from the diaphragm via the cooling ring and transferred, for example, to the housing element and/or to another component. By way of example, a particularly large surface area can be created by profiling the pressurized can, in particular the housing element and/or the cooling ring. As a result, particularly advantageous heat dissipation can be represented via the surface.

The boost pressure of the exhaust gas turbocharger can be adjusted, in particular regulated, by actuating the valve element. The adjustment or regulation of the boost pressure is also referred to as internal waste gate control. By way of example, the actuating device, in particular the housing element, is mounted directly on the exhaust gas turbocharger, which is also referred to as a turbocharger, in particular on a housing of the exhaust gas turbocharger. The housing is a turbine housing, for example. Due to this direct connection of the actuating device to the exhaust gas turbocharger and due to a heat transfer via the rod, which is or functions for example as a push rod, to the valve element, which is designed for example as a flap and is also referred to as a waste gate flap, the diaphragm can be exposed to particularly high temperatures. In applications with confined installation spaces and poor cooling of an engine compartment, such as may be provided for buses or so-called off-highway applications (applications away from dual carriage ways and motorways), even diaphragms made of very high-quality materials reach their service life limits, in particular with regard to a thermal load. By means of the invention, a particularly high heat dissipation from the diaphragm can be implemented, whereby its temperature can be kept low. This can result in a particularly long service life of the diaphragm. Thus, the invention enables the implementation of an adjustment, in particular a regulation, of the boost pressure also in vehicles, in particular in commercial vehicles such as lorries, which are provided for bus and off-highway applications.

Further advantages, features and details of the invention emerge from the following description of a preferred exemplary embodiment and from the drawing. The features and combinations of features mentioned above in the description as well as the features and combinations of features mentioned below in the description of figure and/or shown alone in the single figure can be used not only in the combination indicated in each case, but also in other combinations or on their own, without departing from the scope of the invention.

BRIEF DESCRIPTION OF THE DRAWING

The drawing shows in the single figure a sectional schematic view of an actuating device according to the invention for actuating a valve element provided for adjusting a boost pressure of an exhaust gas turbocharger.

DETAILED DESCRIPTION OF THE DRAWING

The single figure shows a schematic sectional view of an actuating device 10 which is formed as a pressurized can in the present case, which is used, for example, for an internal combustion engine of a vehicle, in particular a motor vehicle, also referred to as an engine or combustion engine. This means that the vehicle in its fully manufactured state has the internal combustion engine and can be driven by means of the internal combustion engine. At least one exhaust gas turbocharger, which comprises at least one turbine and at least one compressor driveable by the turbine, is allocated to the internal combustion engine. By driving the compressor, air can be compressed and supplied to the internal combustion engine. The turbine is arranged in an exhaust tract of the internal combustion engine, through which exhaust gas from the internal combustion engine can flow. The turbine can be driven by the exhaust gas of the internal combustion engine. For this purpose, the turbine comprises, for example, a turbine housing and a turbine wheel rotatably arranged on the turbine housing, which can be driven by the exhaust gas. Furthermore, the vehicle comprises a bypass device, which has at least one bypass line. The bypass line is fluidically connected to the exhaust tract at a first connection point and at a second connection point. The first connection point is arranged upstream of the turbine wheel, wherein the second connection point is arranged downstream of the turbine wheel. As a result, at least part of the exhaust gas flowing through the exhaust tract can be branched off from the exhaust tract by means of the bypass line and introduced into the bypass line. The exhaust gas branched off from the exhaust tract and introduced into the bypass line can flow through the bypass line and is guided from the first connection point to the second connection point by means of the bypass line. At the second connection point, the exhaust gas can flow out of the bypass line and flow back into the exhaust tract. The exhaust gas flowing through the bypass line bypasses the turbine wheel and thus does not drive the turbine wheel.

The bypass device comprises at least one valve element arranged in the bypass line and also referred to as a waste gate or waste gate valve, by means of which a quantity of exhaust gas flowing through the bypass line can be adjusted. In this case, the valve element can be actuated by means of the actuating device 10 and can thus be moved, in particular pivoted, relative to the bypass line, for example. In particular, the valve element can be designed as a flap, also referred to as a waste gate flap, which can be pivoted about a pivot axis relative to the bypass line, for example. By adjusting the quantity of exhaust gas flowing through the bypass line, a boost pressure to which the air is compressed by means of the exhaust gas turbocharger can be set, in particular regulated. As will be explained in more detail below, the actuating device 10 is designed as a pressurized can, by means of which an internal control of the boost pressure, also referred to as boost pressure control, can be implemented. For this purpose, the actuating device 10 comprises a housing element 12 and a diaphragm 14, which is reversibly deformable, i.e., non-destructively deformable, for example at least along a direction of movement illustrated in the figure by a double arrow 16, and is thereby moveable along the direction of movement relative to the housing element 12. In this case, the actuating device 10 has a pressure chamber 18 which is delimited in part by the housing element 12 and in part by the diaphragm 14, which is elastically deformable, for example. A fluid, in particular a gas, can be introduced into the pressure chamber 18. Since the diaphragm 14 partially directly delimits the pressure chamber 18, the fluid introduced into the pressure chamber 18 can directly contact or come into contact with the diaphragm 14. As a result, the diaphragm 14 is acted upon by the fluid, in particular by a pressure of the fluid, wherein the diaphragm 14, which is also referred to as a pressure diaphragm, is reversibly deformed along the direction of movement and is thereby moved. In this case, the housing element 12 has a connection 13 designed, for example, as a compressed air connection, via which the fluid designed, for example, as compressed air can be introduced into the pressure chamber 18.

The actuating device 10 further comprises a rod 20, also referred to as an actuating rod, which is also referred to or functions or is formed as a push rod. The rod 20 is at least indirectly, in particular directly, coupled to the diaphragm 14, such that the rod 20 can be moved along with the diaphragm 14. In other words, if the diaphragm 14 is reversibly deformed along the direction of movement and thus moved, the rod 20 is thereby moved along the direction of movement and thus translationally relative to the housing element 12. The rod 20 is at least indirectly coupled to the valve element, such that by moving the rod 20 along the direction of movement translationally relative to the housing element 12, the valve element is actuated, in particular moved.

The actuating device 10 further has a receiving space 22 opposite the pressure chamber 18, in particular along the direction of movement. The receiving space 22 is, for example, partially delimited by the diaphragm 14 and partially delimited by a housing element 24. The housing element 24 is formed separately from the housing element 12, for example, and is at least indirectly connected to the housing element 12. A return spring 26 of the actuating device 10 is received in the receiving space 22. The return spring 26 can be supported or is supported along the direction of movement at least indirectly, in particular directly, on the housing element 24 on the one hand, and along the direction of movement at least indirectly, in particular directly, on the diaphragm 14 on the other hand. If, for example, the diaphragm 14 is reversibly deformed in such a way that the diaphragm 14 is translationally moved relative to the housing element 12 and 24 in a first direction coinciding with the direction of movement or running parallel to the direction of movement and illustrated in the figure by an arrow 28, the return spring 26 is tensioned, in particular compressed. As a result, the return spring 26 provides a spring force that acts in a second direction opposite to the first direction, illustrated in the figure by an arrow 30, and in parallel to the direction of movement or coinciding with the direction of movement. The spring force acts from the return spring 26 at least indirectly, in particular directly, on the diaphragm 14, such that the diaphragm 14 can be moved by means of the spring force in the second direction and thus along the direction of movement and thereby relative to the housing elements 12 and 24 and can thus be reset.

In order to reliably avoid excessive thermal loads on the diaphragm 14, the diaphragm 14 is connected to the housing elements 12 and 24 by means of cooling rings 32 and 34, which are each filled with sodium. In other words, sodium is accommodated in the respective cooling ring 32 and 34. For this purpose, the respective cooling ring 32 or 34 has a receiving space 36 or 38, which is at least partially, in particular at least predominantly or completely, filled with sodium. It can be seen from the figure that the diaphragm 14 is arranged along the direction of movement at least partially between the cooling rings 32 and 34 and is clamped between the cooling rings 32 and 34. The cooling rings 32 and 34 are in turn at least indirectly, in particular directly, connected to the housing elements 12 and 24, whereby the diaphragm 14 is connected to the housing elements 12 and 24 through the intermediary of the cooling rings 32 and 34. The cooling rings 32 and 34 are formed separately from each other, for example, and are connected to each other. For this purpose, the cooling rings 32 and 34 are screwed together.

The cooling rings 32 and 34 have through openings 40 aligned with each other, which are penetrated by a shank 42 of a screw 44. The screw 44 is supported via its screw head 46 in the first direction at least indirectly, in particular directly, on the cooling ring 32. On a side of the cooling ring 34 facing away from the cooling ring 32, the shank 42 projects out of the through opening 40 of the cooling ring 34. Thereby, on the side of the cooling ring 34 facing away from the cooling ring 32, a nut 48 is screwed onto the shank 42 and thus screwed to the screw 44. The nut 48 is supported in the second direction on the cooling ring 34. By means of the screw 44 and by means of the nut 48, the cooling rings 32 and 34 are clamped together along the direction of movement, i.e., braced together, whereby the diaphragm 14 is clamped between the cooling rings 32 and 34 and is thus held on the cooling rings 32 and 34.

By means of the sodium accommodated in the cooling rings 32 and 34, a particularly advantageous heat dissipation can be implemented, by which a particularly high amount of heat can be removed from the diaphragm 14 in a particularly short time.

As a result, excessive thermal loads on the diaphragm 14 can be avoided, which can result in a particularly high or long service life of the diaphragm 14. This is in particular advantageous if the actuating device 10 is directly connected to the turbine housing, in particular via the housing element 12 and/or 24.

REFERENCE NUMERAL LIST 10 actuating device
12 housing element
13 connection
14 diaphragm
16 double arrow
18 pressure chamber
20 rod
22 receiving space
24 housing element
26 return spring
28 arrow
30 arrow
32 cooling ring
34 cooling ring
36 receiving space
38 receiving space
40 through openings
42 shank
44 screw
46 screw head
48 nut

The invention claimed is:

1. An actuating device (10) for actuating a valve element of an exhaust gas turbocharger, comprising:
 a pressure chamber (18) which is delimited in part by a first housing element (12) and in part by a diaphragm (14) formed separately from the first housing element (12), wherein compressed air is introducible into the pressure chamber (18) and wherein the diaphragm (14) is reversibly deformable in order to actuate the valve element;
 wherein the diaphragm (14) is held on the first housing element (12) by a first cooling ring (32), wherein the first cooling ring (32) has a first receiving space (36), and wherein the first receiving space (36) of the first cooling ring (32) is at least partially filled with sodium; and
 a second receiving space (22) opposite the pressure chamber (18) and delimited in part by the diaphragm (14) and in part by a second housing element (24), wherein a return spring (26) for resetting the diaphragm (14) is disposed in the second receiving space (22);
 wherein the diaphragm (14) is held on the second housing element (24) by a second cooling ring (34), wherein the second cooling ring (34) has a third receiving space (38), and wherein the third receiving space (38) of the second cooling ring (34) is at least partially filled with sodium.

2. The actuating device (10) according to claim 1, wherein the first cooling ring (32) and the second cooling ring (34) are formed separately from each other and are connected to each other.

\* \* \* \* \*